(12) United States Patent
Welles, II et al.

(10) Patent No.: US 6,737,984 B1
(45) Date of Patent: May 18, 2004

(54) AUTOMATIC METER READING SYSTEM USING LOCALLY COMMUNICATING UTILITY METERS

(75) Inventors: Kenneth Brakeley Welles, II, Scotia, NY (US); Wolfgang Daum, Louisville, KY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/522,383

(22) Filed: Mar. 10, 2000

Related U.S. Application Data

(63) Continuation-in-part of application No. 09/132,080, filed on Aug. 10, 1998, now abandoned.
(60) Provisional application No. 60/055,904, filed on Aug. 15, 1997.

(51) Int. Cl.[7] ................................................ G08C 15/06
(52) U.S. Cl. ........................... 340/870.02; 340/310.01; 455/3.3
(58) Field of Search ....................... 340/870.02, 870.03, 340/310.01, 310.03, 310.06, 870.18; 455/3.3

(56) References Cited

U.S. PATENT DOCUMENTS

| | | | | |
|---|---|---|---|---|
| 3,659,280 A | * | 4/1972 | Donohoo | 340/310.03 |
| 4,101,834 A | * | 7/1978 | Stutt et al. | 370/482 |
| 4,350,980 A | * | 9/1982 | Ward | 340/870.02 |
| 4,446,458 A | * | 5/1984 | Cook | 340/3.21 |
| 4,700,188 A | * | 10/1987 | James | 340/870.03 |
| 5,581,229 A | * | 12/1996 | Hunt | 340/310.01 |
| 5,777,544 A | * | 7/1998 | Vander Mey et al. | 340/310.06 |
| 6,151,480 A | * | 11/2000 | Fischer et al. | 340/310.01 |

* cited by examiner

Primary Examiner—Timothy Edwards
(74) Attorney, Agent, or Firm—Jean K. Testa; Patrick K. Patnode

(57) ABSTRACT

A low cost frequency shift keying communications system for communication between utility meters within a local area network and for communication with a central database. Transmitters coupled to the utility meters transmit utility meter data measurements over power lines to at least one power line receiver associated with another utility meter within the local area network. The power line receiver communicates the data measurements from each utility meter to the central database via telephone or radio frequency transmitter.

23 Claims, 12 Drawing Sheets

AUTOMATIC METER READING SYSTEM USING LOCALLY COMMUNICATING UTILITY METERS

CROSS REFERENCE TO RELATED APPLICATIONS

This application is a continuation in part of application Ser. No. 09/132,080 filed Aug. 10, 1998, now abandoned, which claims the benefit of U.S. Provisional Application No. 60/055,904 filed Aug. 15, 1997.

BACKGROUND OF THE INVENTION

This invention relates to a power line communication system, and more particularly to a power line communication system utilizing a local area network to relay utility usage data to a transmitting meter for transmission to a central database.

A power line communication system typically transmits and receives data over standard electrical house type wiring. An example of such a system is the remote intercom system using electrical wiring within a building to communicate data between the transmitter and receiver. A system such as this does not communicate with an external database, nor does it communicate between two or more buildings.

Utility meter communication systems exist that communicate with a central database by way of a radio frequency transmitter. For example, U.S. Pat. No. 5,495,239 discloses a system in which utility meter electronics communicate with a remote interrogator in a vehicle as it approaches the utility meter in a building. Additionally, utility meter communication systems exist which are able to communicate via telephone with a central database as is disclosed, for example, in U.S. Pat. No. 4,833,618. Utility meters in these utility meter communication systems lack the ability to communicate with one another and consequently, each utility meter must communicate with the central database or mobile interrogator. It would be desirable for utility meters within a utility meter communication network to have the capability of communicating with one another between multiple buildings. Additionally, there exists a need for a power line utility meter communication system with the capability of communicating with other utility meters within a local area network and communicating with a central database.

Present utility meter communication devices employ several electronic parts which result in a high cost of acquisition and maintenance of the communication module. It is desirable to have a utility meter communications system with relatively few parts that communicates with other utility meters and that can be constructed cheaply, and that require little maintenance.

BRIEF SUMMARY OF THE INVENTION

The present invention addresses the foregoing needs by providing a power line communications system that enables utility meters to communicate with one another over power lines utilizing a frequency shift keying communication technique to transmit and receive utility usage data from each utility meter so that at least one utility meter within a local area network necessarily communicates with a central database.

In an exemplary embodiment of the present invention a low cost power line communications system enables utility meters to communicate with one another over power lines utilizing a amplitude modulation communication technique to communicate utility usage data to each utility meter so that any one utility meter within a local area network indirectly communicates with a remote interrogator.

In a further exemplary embodiment of the present invention a narrow band bandpass filter circuit is employed which enables the power line communication system to select at least one very narrow frequency band within which to communicate utility meter data, thus avoiding noise and other communications pitfalls on the power line.

BRIEF DESCRIPTION OF THE DRAWINGS

The features of the inventions believed to be novel are set forth with particularity in the appended claims. The inventions both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
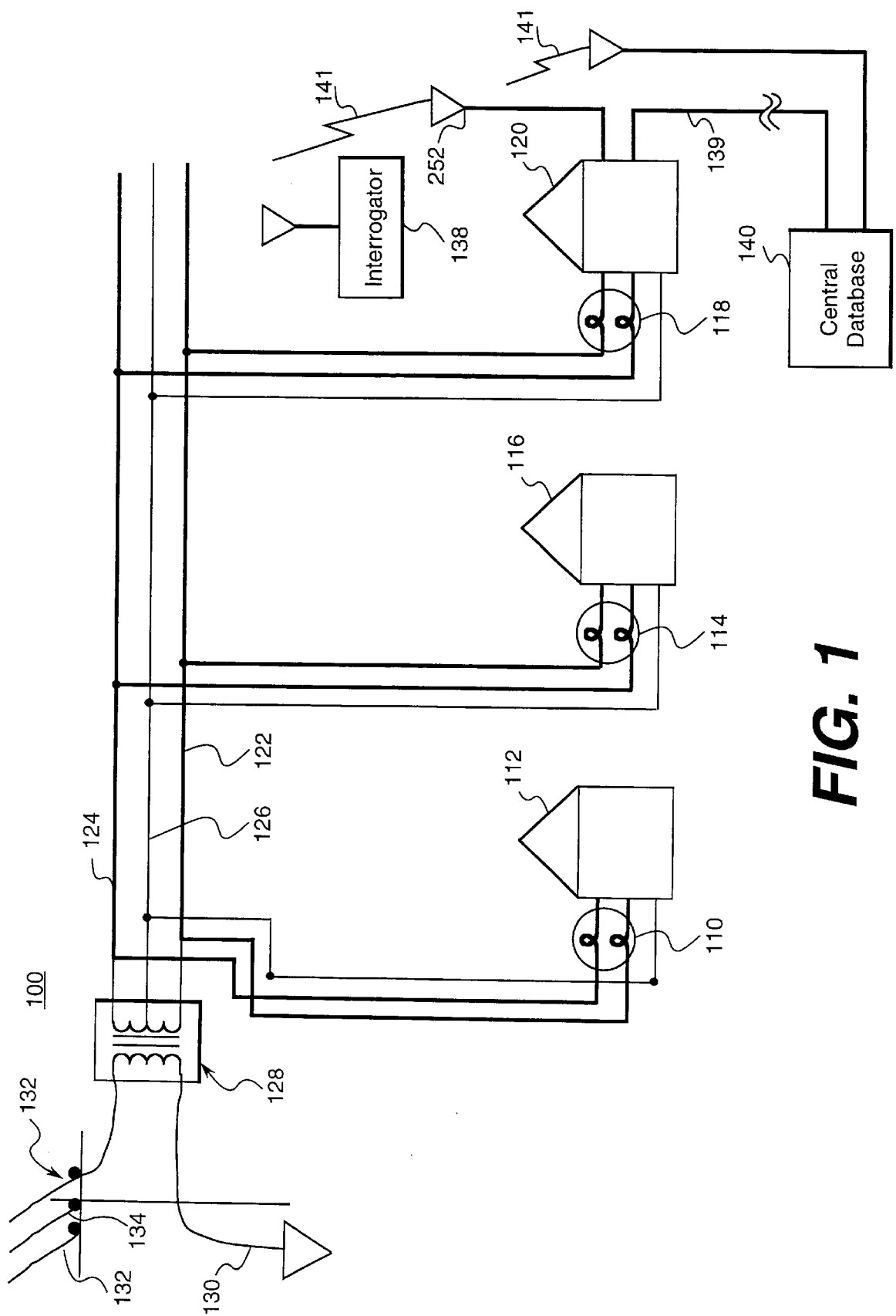
FIG. 1 is an illustration of a power line local area network of the present invention.

A utility meter communication system 100 is described wherein a plurality of utility customers, e.g., 112, 116 and 120, each having corresponding utility meters on the secondary side of a distribution transformer 128 have the ability to communicate with one another via a power line communication system within a "local area network," as is illustrated in FIG. 1. For purposes of this specification a "customer" refers generally to a consumer of a utility, such as electricity, which consumption is monitored and measured by means of a utility meter. The term "customer" refers more specifically to a building housing devices which consume a utility such as electricity to operate. Customers include residential buildings as well as commercial buildings.

Examples of utilities include, but are not limited to, electricity, gas and water. Reference to a "local area network" in this specification identifies a set of utility meters having the capability of communicating with one another by way of power line cables. For example, power line cable 124 forms a "local area network" communications path between buildings 112, 116, and 120. Power line cable 124, along with meters 110 adapted for communication with each other, thus forms the "local area network" communication path.

Power line cable 124 cable has a common electrical path at each building 112, 116 and 120. Likewise, power line cables 122 and 126 are in electrical communion at each customer 112, 116, and 120, so as to form a "local area network" communications path. Power line cables 122, 124, and 126 are also each coupled to the secondary side of a distribution transformer 128. Distribution transformer 128 is in electrical communication with a high voltage power line 132, where high voltage power line 132 is typically about 4,000 volts alternating current (VAC). Distribution transformer 128 is also coupled to a ground potential via power line transformer ground 130. Power line cable 126 is the power line neutral. In one embodiment of the invention, a communication path is formed by power lines 122 and 124 (illustrated in FIG. 4). As those of ordinary skill in the art will recognize other configurations of power lines 122, 124 and 126 may be utilized to form a communications path for local area network 100. In the United States, distribution transformer 128 is, typically, in electrical communication with two to ten single family buildings.

Figure 2:
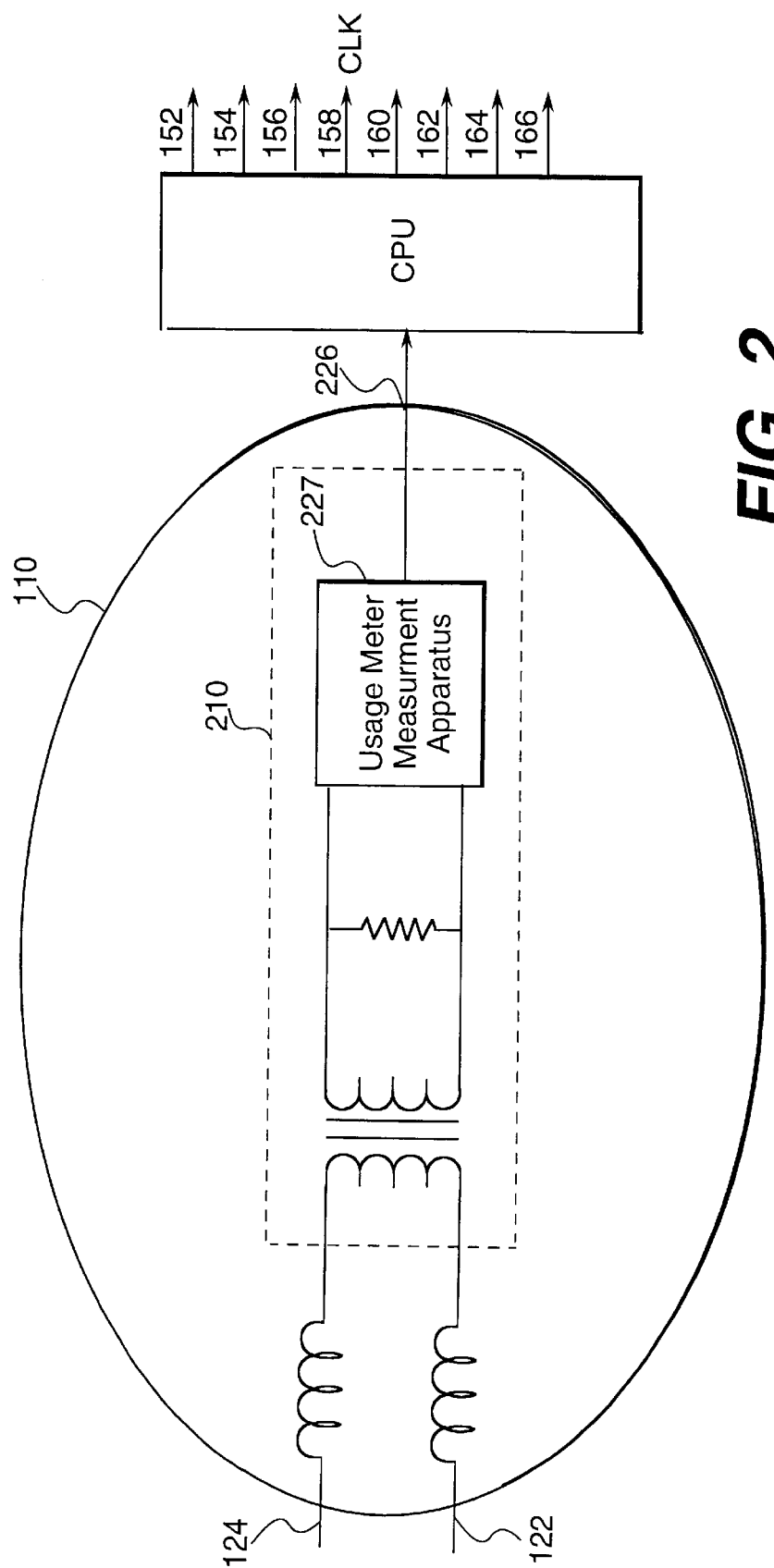
FIG. 2 is a schematic block diagram of an electronic meter power measurement device of the present invention.
Figure 3:
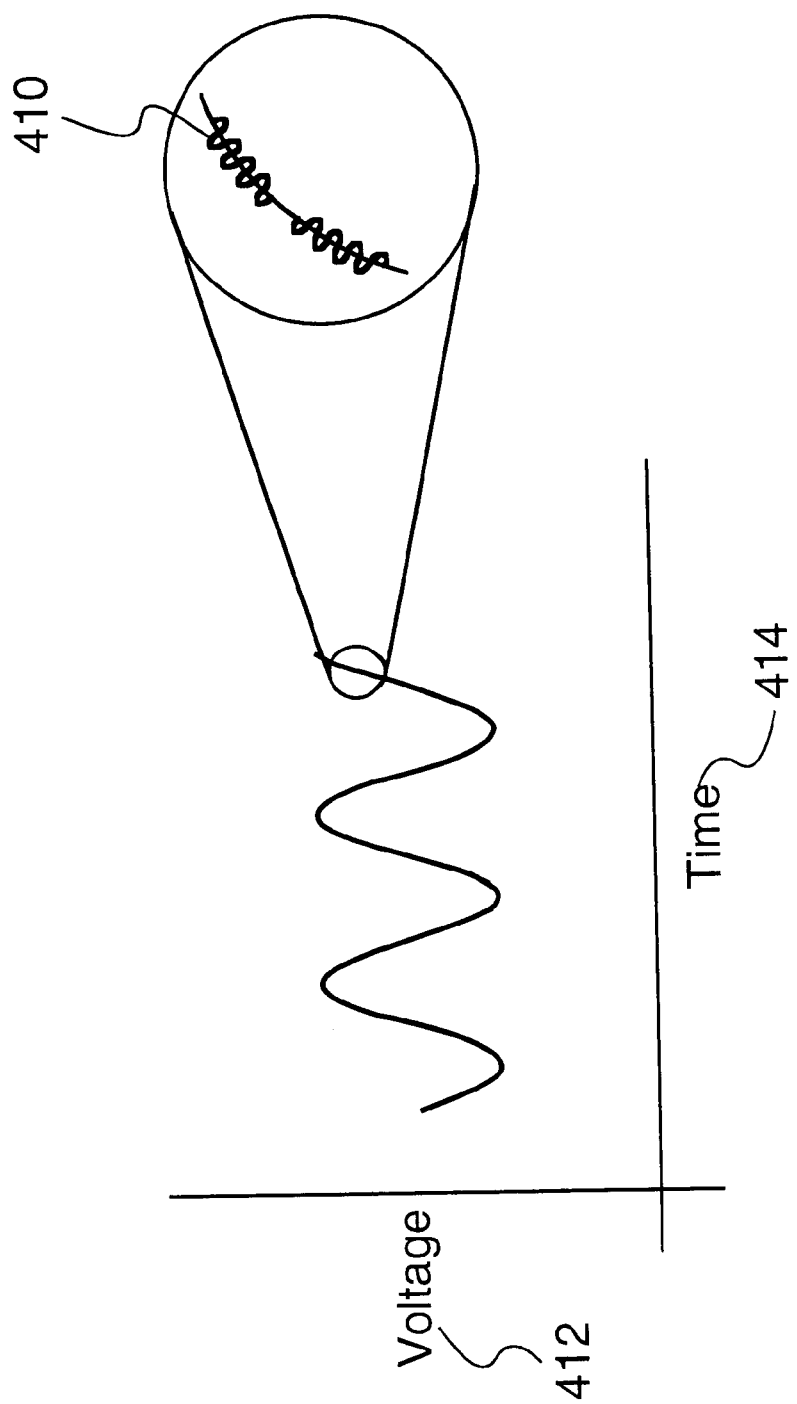
FIG. 3 is a graphical illustration of the power line voltage wave form with power line communication data superimposed.

Electric meter 110 is an electric utility meter as illustrated in FIG. 2. Although the invention is described in terms of an electric utility meter, it is important to note that other utility meters may be adapted in accordance with the invention to communicate metered data between buildings via power lines. In the embodiment shown in FIG. 2 power lines 122 and 124 are coupled to meter 110. Meter 110 is configured to include meter usage measurement apparatus 227. For purposes of this specification the term "configured" means equipped with appropriate components, the components operatively arranged, connected and programmed to achieve a specified function. Usage measurement device 210 measures the voltage and current carried by power lines 122 and 124 by means of usage meter measurement apparatus 227. Usage meter measurement apparatus 227 converts this power usage data into a digital signal suitable for use by CPU 900 and provides the digital signal at an output, as indicated at 226. The digital signal comprises utility meter data, for example, an electric meter voltage reading, a current reading, and an identification (ID) code for utility meter 110.

Digital signal 226 is coupled to a CPU 900. In one embodiment of the invention, CPU 900 resides within utility meter 110. In an alternative embodiment of the invention, CPU 900 resides outside the housing of utility meter 110. CPU 900 is configured to receive digital signal 226 and to convert the utility usage data of signal 126 into a signal 152 having an electronic format suitable for radio frequency transmission over power lines by FSK transceiver 224 (illustrated in FIG. 4). In one embodiment of the invention usage data signal 126 is converted to a packet format, which includes a preamble followed by serial data. Such packet formats are typical of digital communications systems and are well understood by those of ordinary skill in the art.

Figure 4:
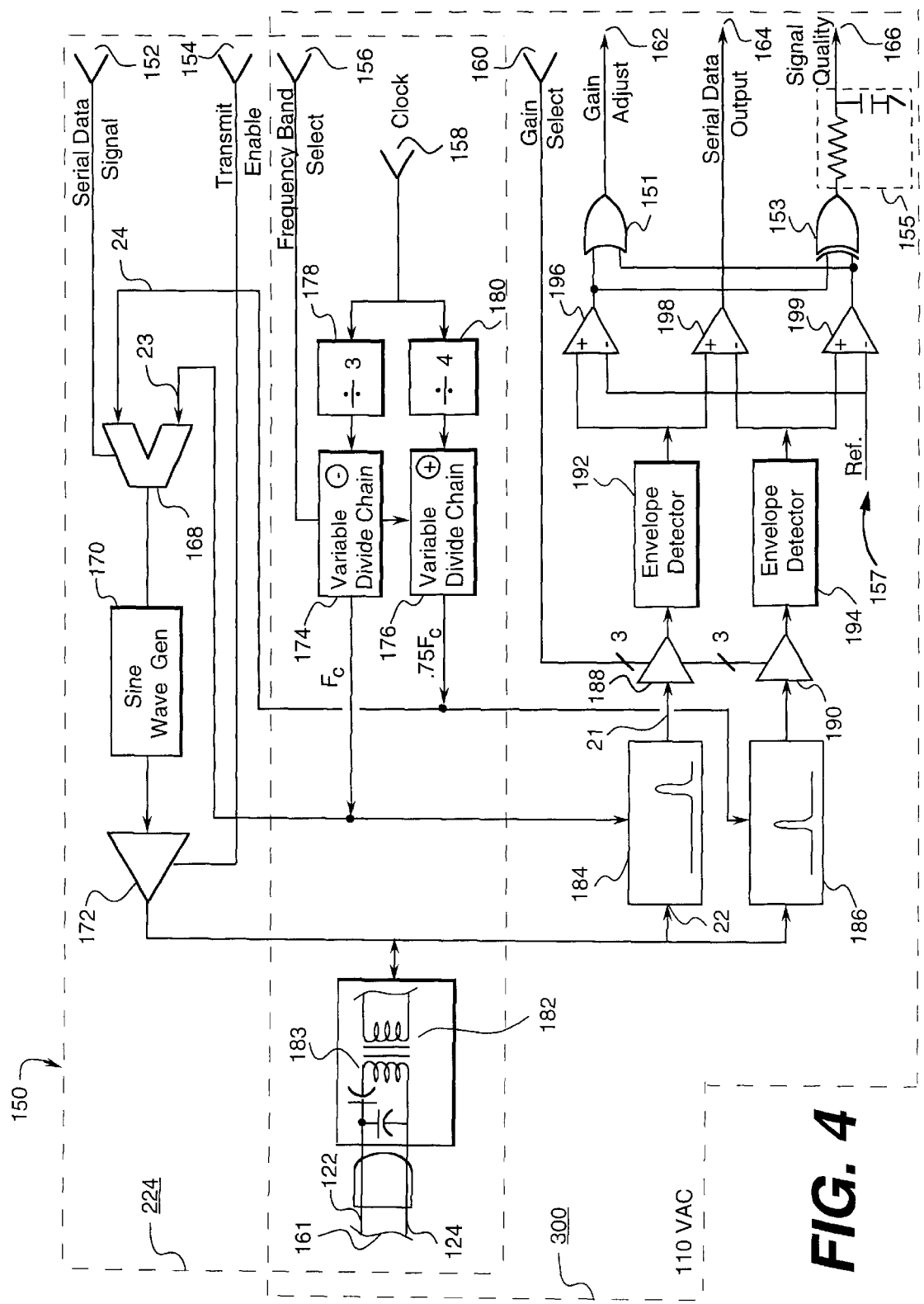
FIG. 4 is a block diagram of a frequency shift keyed (FSK) communication system of the present invention.

In addition to receiving digital signal 226 from meter 110, CPU 900 is configured to receive signals 162, 164 and 166 from FSK power line transceiver 150 (shown in FIG. 4). Based on the signals it receives, CPU 900 provides digital signal 152, along with control signals 154, 156 and 158 and 160 to FSK power line transceiver 150. CPU 900 is programmed in accordance with an algorithm of the invention which is described in detail hereinbelow.

FSK Transmitter

FIG. 4 is a block diagram of FSK power line transceiver 150. FSK power line transceiver 150 comprises two sections, FSK power line transmitter 224 and FSK power line receiver 300. FSK power line transceiver 150 is configured to operate in one of two alternative modes, transmit mode and receive mode. FSK power line transmitter 224 comprises multiplexer 168, sine wave generator 170; power amplifier 172; center frequency variable divider 174; non-center frequency variable divider 176; first divider 178; and second divider 180.

As previously stated, FSK power line transmitter 224 is configured to receive serial data signal 152 from CPU 900. In one embodiment of the invention, modulation of serial data signal 152 is generally carried out employing typical FSK modulation techniques known to those of ordinary skill in the art. However, unlike typical FSK transmitters, transmitter 224 is configured to pre-select optimum frequency pairs to FSK modulate data signal 152 based upon information about the power lines it receives from receiver 300. In other words, transmitter 224 is configured to transmit the meter usage data contained in signal 152 over a respective power line cable 122, 124, or 126 using a pre-selected optimum transmission frequency pair.

As shown in FIG. 4, multiplexer 168 is coupled to CPU 900 and receives serial data signal 152 from CPU 900. Also coupled to multiplexer 168 are center frequency signal (fc), indicated at 23, and off center frequency signal (0.75 fc) indicated at 24. Signals 23 and 24 comprise the FSK signal pair used to modulate signal 152 prior to transmission. Signals 23 and 24 are generated as follows. A clock signal 158, in one embodiment of the invention the CPU 900 clock running at about 4 MHz, is provided to first divider 178 (divide by 3) and to second divider 180 (divide by 4). The outputs of dividers 178 and 180 are provided to variable divider 174 and variable divider 176, respectively. Also provided to variable dividers 174 and 176 is frequency band select signal 156. Frequency band select signal 156 determines the division factor for dividers 174 and 176 and thus, the frequencies of modulating signals fc and 0.75 fc respectively.

Center frequency fc and non-center frequency 0.75 fc are coupled to multiplexer 168 where fc and, alternatively, 0.75 fc are coupled to sine wave generator 170 based on the status of serial data signal 152. If a data bit of serial data signal 152 is a logical one then the fc signal is coupled to sine wage generator 170. Alternatively, if a data bit on serial data line 152 is a logical zero then the 0.75 fc signal is coupled to sine wave generator 170.

In one embodiment of the invention sine wave generator 170 generates a sine wave having a frequency about one sixth of the frequency of the signal it receives. As those of ordinary skill in the art will recognize, other frequency division multiples may be selected for sine wave generator 170 depending on, for example, selected data transmission rates and modulation frequencies. Sine wave generator 170 provides an FSK modulated signal having a frequency 0.167 fc or 0.125 fc, depending on the value of the data bit to be transmitted. Sine wave generator 170 is coupled to power amplifier 172. Also provided to power amplifier 172 is transmit enable signal 154. When transmit enable signal 154 is activated by CPU 900, power amplifier 172 provides the amplified FSK modulated signal to coupler 182. Coupler 182 is a typical power line coupler configured to couple the amplified signal from power amplifier 172 to a respective power line 122, 124, or 126.

FSK Power Line Receiver

FSK power line receiver 300 comprises: band pass filter 186, which is a non-center frequency, narrow band pass filter; band pass filter 184, which is a center frequency narrow band pass filter; center frequency variable gain amplifier 188; non center frequency variable gain amplifier 190; center frequency envelope detector 192; non center frequency envelope detector 194; center frequency power comparator 196; serial data comparator 198; non-center frequency power comparator 199; gain adjust OR gate 151; signal quality "exclusive OR" ("XOR") gate 153; and signal quality filter 155.

Signal lines coupled from FSK power line receiver 300 to CPU 900 include: signal power reference 157; gain select signal 160; center frequency fc and non center frequency 0.75 fc. Signal lines coupled to FSK power line receiver 300 comprise: gain adjust line 162; serial data output signal 164; and signal quality signal 166.

When power line transceiver 150 is in transmit mode, CPU 900 directs power line receiver 300 to scan power line cable 161 (comprising, in this embodiment, power lines 122 and 124), over a plurality of frequency pairs to gather information about the power line at each frequency pair. The information gathered includes information about noise levels on the power line and whether the power line is in use by another transceiver in local area network 100 for radio frequency transmission of data. Receiver 300 is configured to provide this information to CPU 900 via signal quality signal 166. CPU 900 is programmed to select desirable frequencies for transmission based on signal 166.

In receive mode FSK power line receiver 300 monitors the output of power line coupler 182 to detect the presence of data from other power line transmitters 224 in the "local area network." When a data signal is detected, FSK power line receiver 300 receives utility meter data on a respective power line 122, 124, or 126 and demodulates utility meter data into digital data suitable for reception by CPU 900. According to one embodiment of the invention CPU 900 then forwards this data to a central database via a telephone link 139 or remote interrogator 138 as illustrated in FIG. 1.

Coupler 182 and band pass filter 183 couple data signals from power line 161 to receiver 300, and specifically to narrow band pass filters 184 and 186. In addition to desired signals, coupler 182 passes 60 Hertz power signals, noise and other low frequency signals, i.e., those occurring at frequencies below about 10,000 Hertz. Noise and signals at these lower frequencies typically present difficulties for receivers in general. Consequently, a preferred embodiment of the invention utilizes frequency pairs between about 10,000 and about 100,000 Hertz as FSK signaling frequencies. Receiver 300 and CPU 900 are configured such that in the event that receiver 300 detects spurious data or noise in portions of the frequency range from about 10,000 Hertz to about 100,000 Hertz, CPU 900 selects alternative operational frequencies within that range for transmission. Thus transmission via frequencies in which there is spurious data or noise is avoided. Spurious data are defined as data that are not generated by the power line communication system within the local area network.

Although a frequency range of about 10,000 to about 100,000 Hertz is selected as the frequency scan range in receive mode, any frequency scan range may be utilized depending on the electronic data signaling rate and the transmission approach selected. Typically, utility meter signal rates are 100 to 9600 baud depending on the amount of data that needs to be transmitted. In one embodiment of the invention, the preferred data signal rate is in the 100 to 300 baud range since a small number of utility meters communicate in the same local area network.

Center frequency fc and non-center frequency 0.75 fc signals are provided to pass band filters 184 and 186 respectively. Band pass filters 184 and 186 are configured in accordance with the invention to pass only those signals which have a center frequency corresponding to center frequency fc and non center frequency corresponding to non center frequency 0.75 fc. Thus, only utility meter data transmitted at frequencies corresponding to the selected center frequency and non-center frequency are passed by band pass filters 184 and 186 respectively.

In one embodiment of the receive mode configuration of the invention, FSK power line receiver 300 (FIG. 4) locks onto signals at a selected frequency upon detecting a valid signal at that frequency. Frequency lock occurs when signal quality line 166 is active, thus indicating a valid signal. Signal quality line 166 is active when the center frequency envelope detector signal generated by center frequency envelope detector 192 is greater than a signal power threshold level as defined by signal power reference 157, and alternatively, when non-center frequency envelope 194 is below the signal power threshold of signal power reference detector 157.

The signal quality signal is also active when the following two conditions are met. First, the center frequency envelope detector signal (generated by center frequency envelope detector 192) is less than a signal power threshold level. The signal power threshold level is defined by signal power reference 157. Second, when the non-center frequency envelope detector signal generated by non-center frequency envelope detector 194 is greater than signal power threshold of signal power reference 157. These two conditions are implemented with signal quality XOR gate 153. The frequency lock occurs because switched capacitor filters 184 and 186 are adapted to generate signals 180 degrees out of phase with one another when locked onto the FSK power line transmitter frequency. For example, when fc is active 0.75 fc is inactive. Since FSK power line transmitter 224 will transmit either 0.167 fc or 0.125 fc only these two frequencies will be "OFF" and "ON" or correspondingly "ON" and "OFF" respectively at any temporal interval. Thus, serial data output comparator 198 generates the desired serial data output signal when a frequency lock has been identified.

Gain adjust line 162 (FIG. 4) is activated to signal the CPU to increase amplifier gain if either the output of center frequency envelope 192 is below power quality reference 157 or if the output of non-center frequency envelope 194 is below signal power reference 157. The amplifier gain is increased by adjusting upward the gain of center frequency variable gain amplifier 188 and non-center frequency variable gain amplifier 190. If after several gain adjustments are made through the entire amplification range and no frequency match has occurred, another frequency is selected by the CPU and the frequency matching process described above is repeated.

Table 2 lists an example of fourteen frequencies selected by FSK transceiver 150 at two different clock frequencies, to illustrate one exemplary embodiment of the frequency selection range of the present invention.

Switched Capacitor Narrow Band pass Filter

Narrow band pass filters 184 and 186 of FSK power line receiver 300 are adapted to scan the frequency spectrum from about 10,000 Hertz to about 100,000 Hertz by sequentially stepping through pairs of pass frequencies within this range. In transmit mode the frequency spectrum is scanned to find a clear frequency pair from which transmitter 224 may transmit utility meter data using FSK modulation. In one embodiment of the invention, narrow band pass filters 184 and 186 are implemented using switched capacitor filters.

Figure 6:
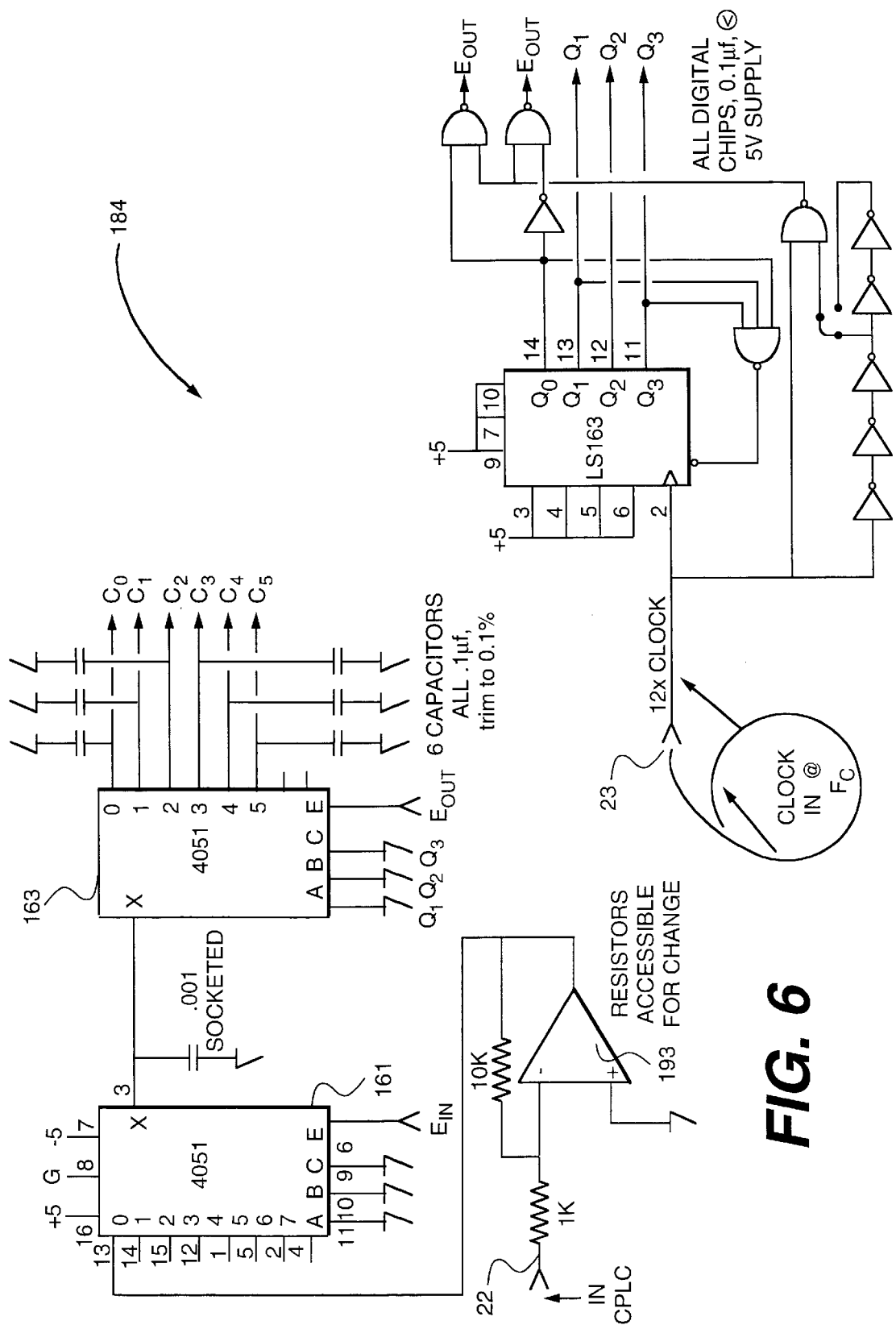
FIGS. 6 and 7 are schematic diagrams of an alternative embodiment of the narrow band pass filter depicted in FIG. 5.
Figure 7:
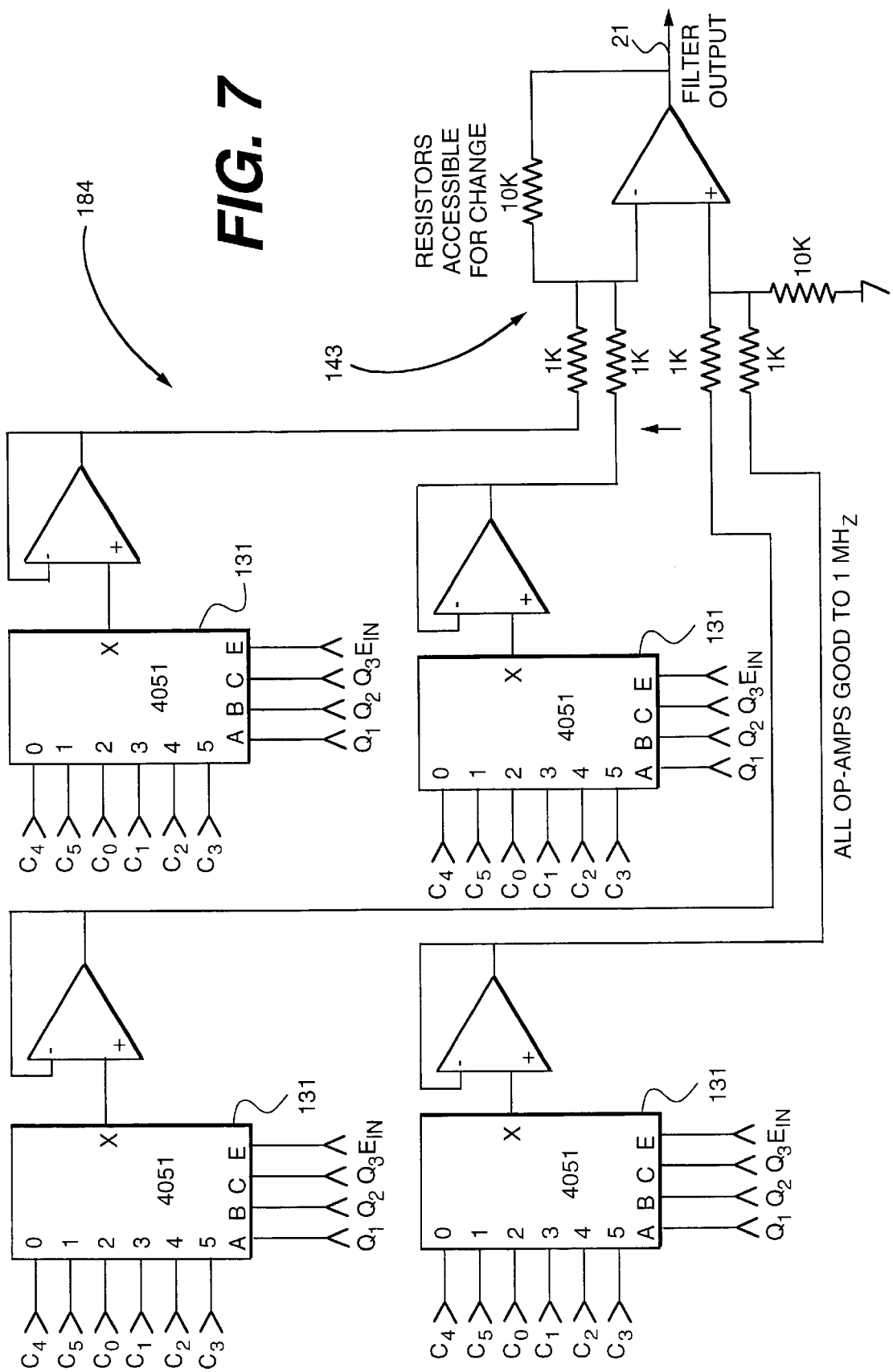

Narrow band pass filters 184 and 186, illustrated in FIG. 4, provide signal filtering within a narrow band of frequencies to produce a high "Q" band pass filtering function. For purposes of this specification a narrow band pass filter is a filter having a bandwidth of less than about 10% of its center frequency. In one embodiment of the invention, narrow band pass filters 184 and 186 have bandwidths less that about 1% of their center frequencies. Narrow band pass filters 184 and 186 are further illustrated in the block diagram of FIG. 5, and in the schematic diagram of FIGS. 6 and 7. In this Specification "Q" is defined as the ratio of the capacitance of capacitor 4 to the capacitance of effective capacitor 23. The values of these capacitors determine the Q and the bandwidth of filters 184 and 186. Although only center frequency narrow band pass filter 184 is illustrated in FIGS. 5, 6 and 7, it is understood that equivalent circuits are utilized for non-center frequency narrow band pass filter 186 where fc is about 0.75 fc.

$$Q = (\text{capacitance } 4)/(\text{effective capacitance } 23) \qquad \text{equation 1}$$

Figure 5:
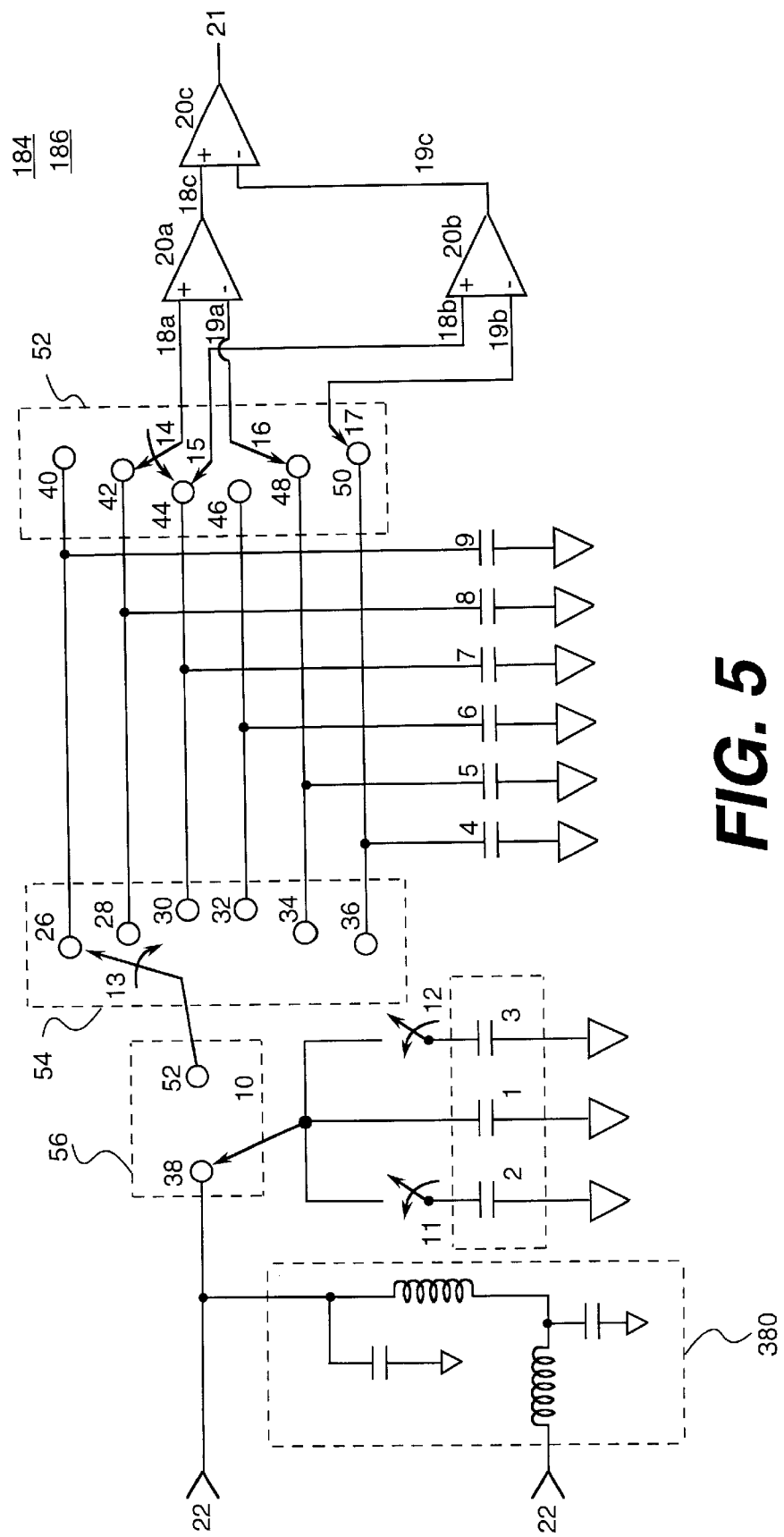
FIG. 5 is a schematic diagram of an embodiment of a narrow band pass filter of the present invention.

Narrow band pass filter 184 illustrated in FIG. 5 comprises: switches 11, 12, 52, 54, and 56; capacitors 1, 2, 3, 4, 5, 6, 7, 8, 9; and differential amplifiers 20a, 20b, and 20c. Filter input signal at filter input line 22 and center frequency signal fc are coupled to narrow band pass 184 (FIG. 4). Correspondingly, filter input signal at filter input line 22 and non-center frequency signal 0.75 fc are coupled to capacitor filter 186. Narrow band pass filter 184 generates filter output signal at narrow band pass filter line 21.

Switch 56, illustrated in FIG. 5, comprises a single pole double throw switch having pole 10 and having terminals 38 and 52. Switch 54 is a single pole six through rotary switch having pole 13 and having six terminals including terminals 26, 28, 30, 34, and 36. Switch 52 is a 4 pole six terminal switch comprises poles 14, 15, 16, and 17; and also having terminals 40, 42, 44, 46, 48, and 50. Note that the switches identified in this Specification, including switches 11, 12, 52, 54, and 56, may comprise electronic switches. For example, switches 11, 12, 52, 54, and 56 comprise electronic functions generated by electronic gate "4051"®, produced by National Semiconductor.

FIG. 6 illustrates an embodiment of the invention wherein narrow band pass filter 184 is implemented using electronic switches. In the embodiment shown in FIGS. 6 and 7, National Semiconductor analog multiplexers type CD 4051 are utilized to implement switches 11, 12, 52, 54 and 56.

Figure 10:
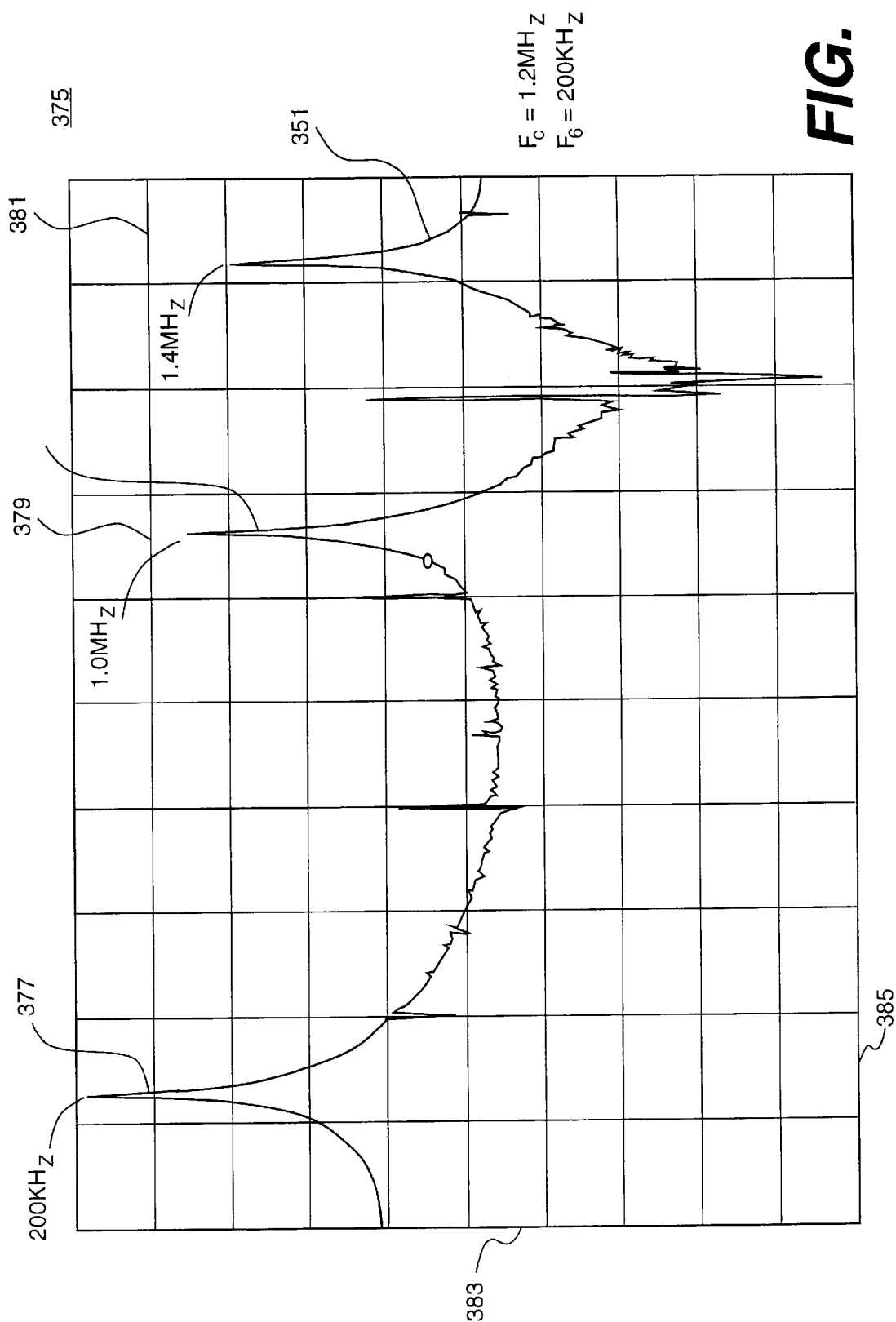
FIG. 10 is a graphical illustration of the frequency response of a frequency shift keyed power line communication system of the present invention.
Figure 11:
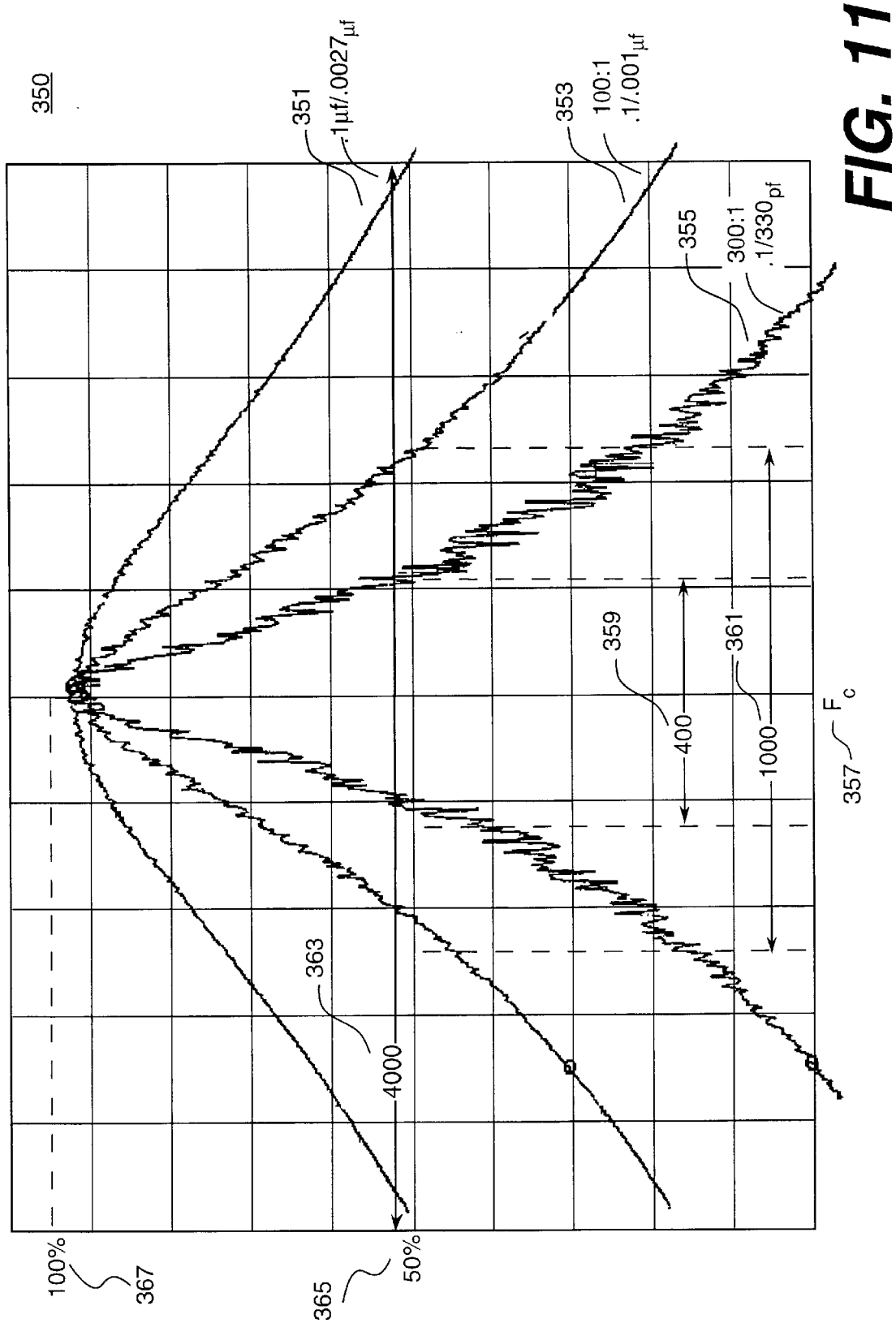
FIG. 11 is a graphical illustration of the frequency response of a frequency shift keyed power line transceiver of the present invention at various "Q" values.
Figure 12:
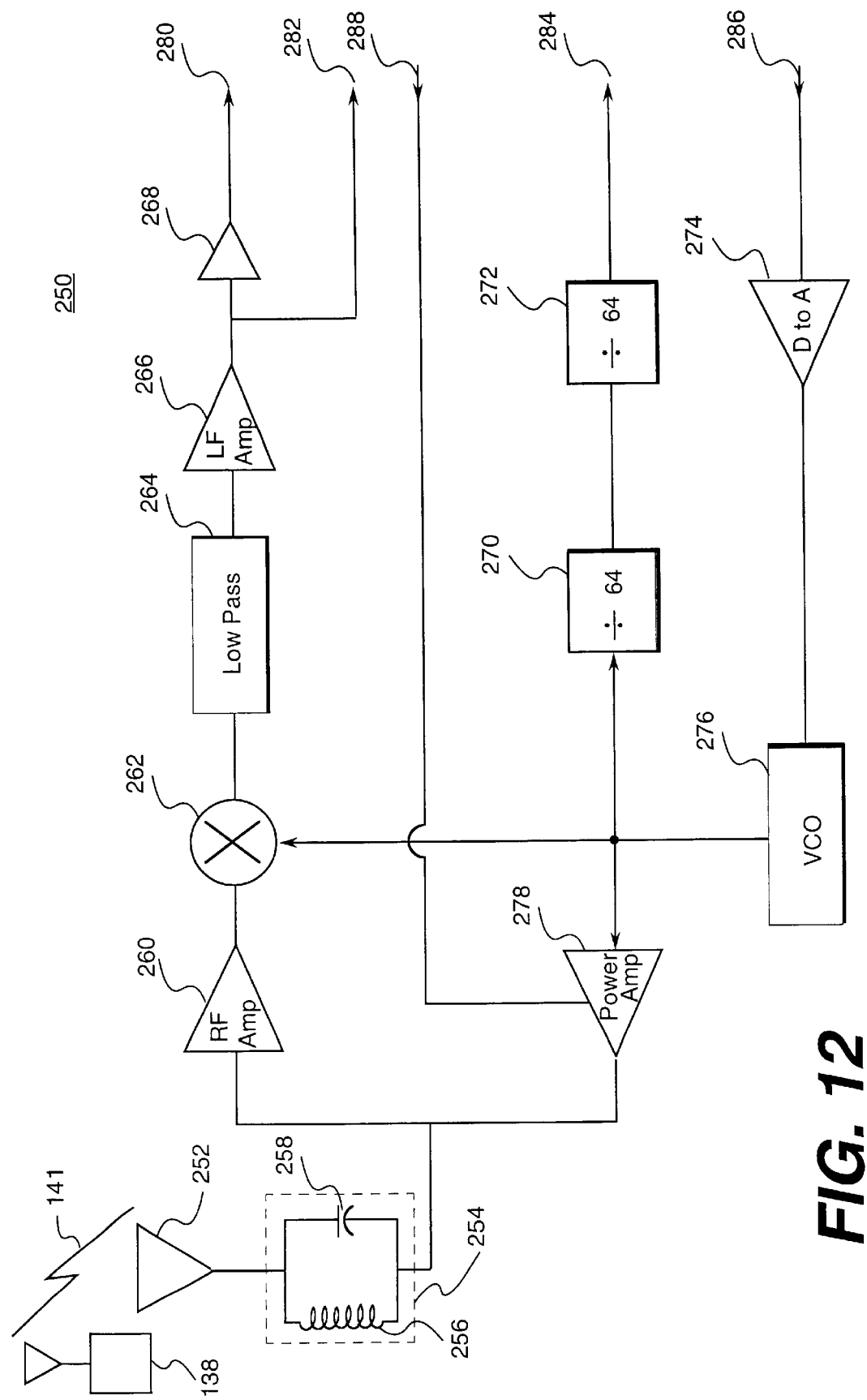
FIG. 12 is a schematic block diagram of an amplitude modulation utility meter communications module of the invention.

Narrow band pass filters 184 and 186 generate a high "Q" signal, i.e., narrow band pass narrow band filter output signal at narrow band pass filter line 21. One example frequency response of narrow band pass filter 184 is graphically illustrated in FIG. 10. The narrow band filter output signal is attenuated by the manner in which the voltage of filter input signal is coupled to capacitors 4 through 9 and summed by differential amplifiers 20a, 20b, and 20c, as is described below.

Switch 56 (FIG. 5) is coupled to filter input line 22 so as to charge effective capacitor 23. The effective capacitance of capacitor 23 may be changed by opening or closing switches 11 and 12. There are four possible capacitance value combinations of effective capacitance 23, as is illustrated in Table 1. The capacitance of capacitors 4 through 9 are closely matched and therefore substantially the same. For example, any capacitor 4 through 9 has a capacitance value within one percent of any other respective capacitor 4 through 9. "Q", as defined by equation 1, is a value that represents the ratio of the capacitance of capacitor 4 to the capacitance of effective capacitance 23. For example, when capacitors 1 through 3 are about 0.1 $\mu$F and capacitors 4 through 9 are about 0.001 $\mu$F, "Q" is about 100.

TABLE 1

Effective Capacitance 23 equations

| Switch 11 | Switch 12 | Capacitance 23 |
|---|---|---|
| Off | Off | C1 |
| Off | Off | C1 + C3 |
| On | Off | C1 + C2 |
| On | On | C1 + C2 + C3 |

Switch 56 enables effective capacitor 23 to be charged by the filter input signal at filter input line 22 while pole 10 is coupled to terminal 38 and subsequently couples the charge in effective capacitor 23 to switch 54 while switch 56 is coupled to terminal 52. Pole 10 transitions from terminal 38 to terminal 52 during each interval when pole 13 is coupled to a terminal selected from the group 40, 42, 44, 46, 48, and 50, so as to transfer the charge proportional to the filter input signal from filter input signal line 22 to capacitors 4 through 9. For example, during time interval ⅙th fc, pole 10 is coupled to each respective terminal 38 and 52 for about ½ of the interval. It is noted that the duty cycle of switch 56 may be varied to maximize the charge transfer efficiency from effective capacitor 23 to capacitors 4, 5, 6, 7, 8, and 9. Switch 13 is coupled to respective terminals 26, 28, 30, 32, 34, and 36 at frequency fc, that is, each of the terminals 26, 28, 30, 32, 34, and 36 is contacted by pole 13 for about ⅙th of frequency fc. Consequently, capacitors 4 through 9 are charged by the voltage level proportional to sequential portions of the time varying filter input voltage. Again, by way of example, when the filter input signal is a sine-wave having a frequency fc, capacitor 4 has a negligible charge, capacitors 5 and 6 each have a positive charge, capacitor 7 has a negligible charge, and capacitors 8 and 9 have a negative charge, after temporal period 1/fc. As such the voltage levels of capacitors 4, 5, 6,7, 8, and 9 are proportional to the time varying voltage level of the filter input signal after a time interval 1/fc.

The following rules limit the operation of poles 14 through 17 as related to pole 13 and terminals 40, 42, 44, 46, 48, and 50 of switches 52 and 54, as illustrated in FIG. 5. Poles 14, 15, 16, and 17 are simultaneously coupled to any four terminals from the group 40, 42, 44, 46, 48, and 50 at any given temporal instant, with the following limitations: poles 14 and 15 are coupled to terminals adjacent to one another; poles 16 and 17 are coupled to terminals adjacent to one another; and poles 15 and 16 are coupled to terminals separated by a single terminal. Next, poles 14 through 17 rotate about terminals within group 40, 42, 44, 46, 48, and 50 at frequency fc, and also have the following limitations. Pole 14 trails pole 13 by single terminal as pole 13 rotates about terminals 26, 28, 30, 32, 34, and 36 at frequency fc. For example, when pole 13 is coupled to terminal 26 pole 14 is coupled to terminal 42. It is also noted that: terminal 26 is electrically the same point as terminal 40; terminal 28 is electrically the same point as terminal 42; terminal 30 is electrically the same point as terminal 44; terminal 32 is electrically the same point as terminal 46; terminal 34 is electrically the same point as terminal 48; and, terminal 36 is electrically the same point as terminal 50.

Pole 14 is coupled to positive differential terminal 18a of differential amplifier 20a. Pole 15 is coupled to the positive differential terminal 18b of differential amplifier 20b. Pole 16 is coupled to negative differential terminal 19a of differential amplifier 20a. Pole 17 is coupled to negative differential terminal 19b of differential amplifier 20b. The signals at lines 18c and 19c, which are generated by of differential amplifiers 20a and 20b, are summed by amplifier 20c and, consequently, narrow band filter output signal is generated on narrow band pass filter line 21.

The above described connections enable narrow band pass filter 184 to have a high "Q" response. If the frequency of the filter input signal at filter input line 22 is substantially the same as fc the differential summation at amplifiers 20a, 20b and 20c will be maximized. Positive voltage levels at positive terminals 18a and 18b will be added and the negative voltage levels at negative terminals 19a and 19b will be subtracted, generating a large narrow band filter output signal. To the degree the filter input signal is not substantially the same frequency as fc narrow band filter output signal will be at a lower magnitude than narrow band filter output signal at frequency fc. For example, if the filter input signal frequency is two times the frequency of fc, charge on capacitors 5, 6, 8, and 9 after being charged with the filter input signal will be near zero. Consequently, the output of differential amplifier 20a will be at a lower magnitude because the signals at positive terminal 18a will be subtracted from the positive signals at negative terminal 19a, thus resulting in a lower magnitude narrow band output filter signal on line 21 than the narrow band output filter signal magnitude at frequency fc.

Narrow band pass filters 184 and 186 enable FSK power line transceiver 150 to monitor selected narrow frequencies on a power line 122, 124, or 126, so as to avoid most spurious data and noise. Narrow band pass filters 184 and 186 are programmable to selected frequencies in the range from about 10,000 Hertz to about 100,000 Hertz dependent upon the frequency of clock signal line 158, as illustrated in Table 2. Although a frequency range of about 10,000 to about 100,000 Hertz is selected as the frequency sweep range, any frequency sweep range may be selected depending on frequency fc and the transmission approach selected.

In one exemplary embodiment narrow band pass filter 184 generated a maximized narrow band filter output signal at fc and had a narrow band pass region around this center frequency fc, as illustrated in the graphical representation of the frequency response of narrow band pass filter 184 in FIG. 7. When the ratio of capacitor 4 to capacitor 23 was selected to be about thirty-seven (351 of FIG. 7) the frequency range at 6 dB attenuation was about 2800 Hz (363); when the ratio of capacitor 4 to capacitor 23 was selected to be about one-hundred (353), the frequency range at 6 dB attenuation was about 1200 Hz (361); and when the ratio of capacitor 4 to capacitor 23 was selected to be about three-hundred (355) the frequency range at 6 dB attenuation was about 600 Hz (359). It is notable that as "Q" was increased the band pass region narrowed. The horizontal axis in FIG. 7 is represented by the frequency and the vertical axis is represented by the gain in decibels (dB).

TABLE 2

| Clock (158) | Band Select (156) | Received Center Frequency | Received Non-Center Frequency |
|---|---|---|---|
| 4 MHz | 4 | 55.56 KHZ | 41.63 KHZ |
| 4 MHz | 5 | 44.44 KHZ | 33.33 KHZ |
| 4 MHz | 6 | 37.04 KHZ | 27.78 KHZ |
| 4 MHz | 7 | 31.75 KHZ | 23.81 KHZ |
| 4 MHz | 9 | 24.69 KHZ | 18.52 KHZ |
| 10 MHz | 6 | 92.59 KHZ | 69.44 KHZ |
| 10 MHz | 7 | 79.37 KHZ | 59.52 KHZ |
| 10 MHz | 8 | 69.44 KHZ | 52.08 KHZ |
| 10 MHz | 9 | 61.73 KHZ | 46.30 KHZ |
| 10 MHz | 10 | 55.56 KHZ | 41.67 KHZ |
| 10 MHz | 11 | 50.51 KHZ | 37.88 KHZ |
| 10 MHz | 13 | 42.74 KHZ | 32.05 KHZ |
| 10 MHz | 14 | 39.68 KHZ | 29.76 KHZ |
| 10 MHz | 15 | 37.04 KHZ | 27.78 KHZ |

It is also noteworthy that narrow band pass filter 184 generated peak frequencies at center frequency 377, fifth harmonic 379, and seventh harmonic 381, as is graphically shown in the frequency response plot (351) of narrow band pass filter 184, as illustrated in FIG. 6. The third harmonic is eliminated by this design. The horizontal axis in FIG. 6 is divided into units of frequency and the vertical axis is divided into units of gain in decibels (dB). Center frequency 377 was about 200 KHZ, fifth harmonic 379 was about 1.0 MHz, and seventh harmonic 381 was about 1.4 MHz Hertz. Although it is possible for unwanted frequencies to be amplified by narrow band pass filter 184 at the fifth and seventh harmonic, these frequencies may be blocked in other ways since they occur at substantially higher frequencies than the center frequency. For example, fifth harmonic 379 and seventh harmonic 381 may be filtered by an external filter 380 (see FIG. 5).

It is further noteworthy that center frequency fc and non center frequency 0.75 fc are independent of the value of "Q." As discussed above, "Q" is dependent on the capacitance of effective capacitor 23. Center frequency fc and non center frequency 0.75 fc is also independent of the capacitance variability of matching capacitors 5 through 9.

FIG. 6 and 6 illustrate an embodiment of filter 184 implemented with analog multiplexers. As shown in FIG. 6, signal fc is provided to the clock input of counter 137. The outputs Eout, Ein, Q1, Q2, and Q3 are coupled to the A, B, C and E inputs of multiplexers 4051. Input signal 22 is coupled from the output of coupler 182 (shown in FIG. 4) to the negative input of operational amplifier 193. The output of operational amplifier 183 is coupled to an input of multiplexer 161. In the embodiment of the invention shown multiplexer 161 as well as multiplexers 131 are CD 4051 mulitplexers. The output x of multiplexer 161 is provided to the input x of multiplexer 163. Outputs C0 through C5 of multiplexer 163 are provided to inputs 0–5 of multiplexers 131 as follows. For a first multiplexer 131, C0 through C5 are connected to inputs 5,0,1,2,3 and 4. For a second multiplexer 131 C0 through C5 are connected to inputs 4,5,0,1,2, and 3. For a third multiplexer 131 C0 through C5 are connected to inputs 2,3,4,5,0 and 1 respectively, and for a fourth multiplexer 131 outputs C0 through C5 are connected to inputs 1,2,3,4,5 and 0 respectively, as shown in FIG. 7. The outputs of multiplexers 131 are combined at operational amplifier 143. The output of operational amplifier 143 corresponds to signal 21 shown in FIG. 4. Signal 21 is the output of band pass filter 184.

The CPU used in FSK transceiver 150 may be the same CPU utilized by the electronic meter. Alternatively, the CPU may be dedicated to FSK power line transmitter 224 (FIG.

4) or FSK power line receiver 300. Alternatively, the CPU may be dedicated to FSK power line transceiver 150. The CPU used in this invention is also coupled to the central data base 140 via either a telephone link 134 or a radio frequency link 141 to communicate utility meter 100 data to central database 140 (FIG. 1).

CPU in Transmit Mode

Figure 8:
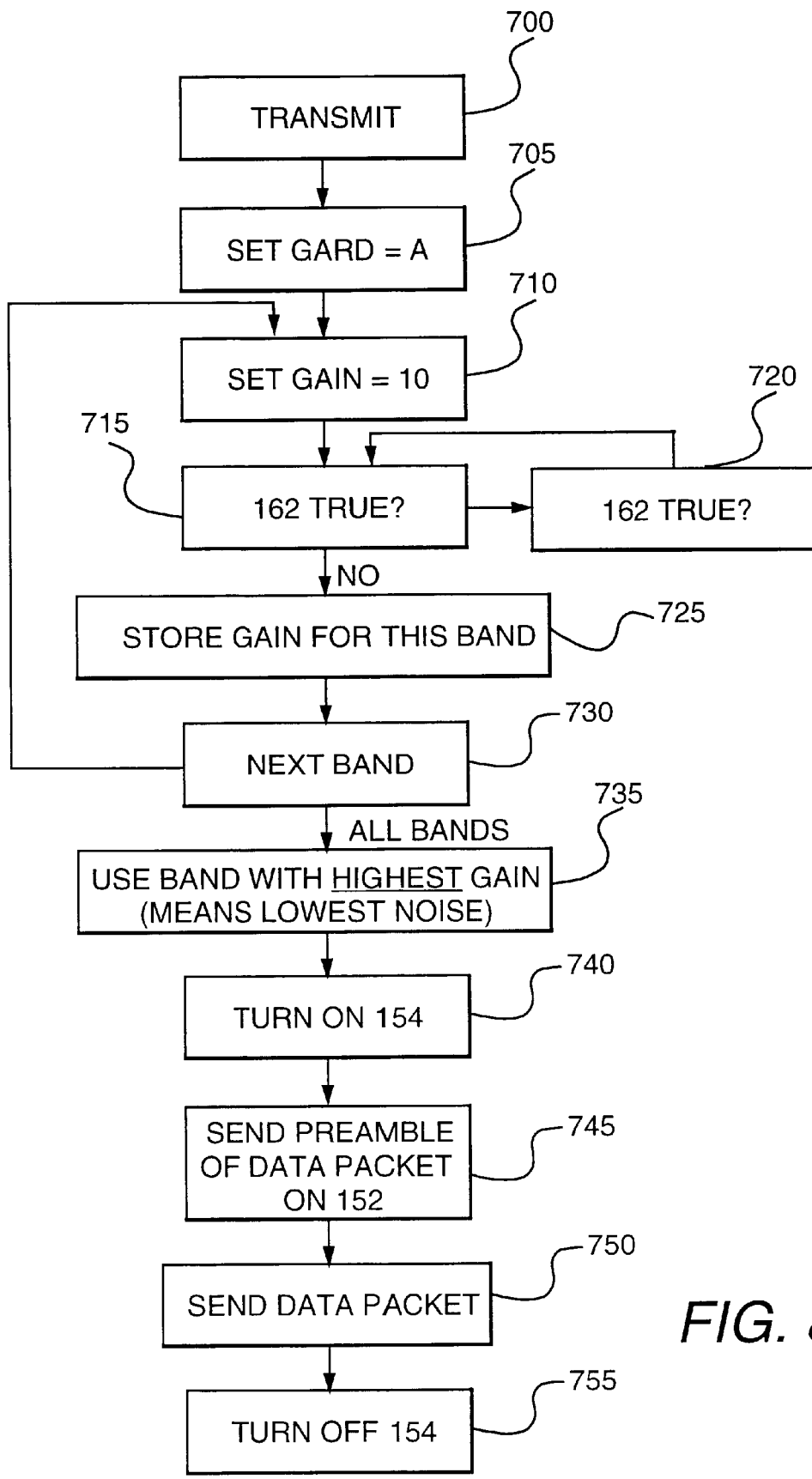
FIG. 8 is a flowchart depicting the operation of a CPU in transmit mode in accordance with an embodiment of the invention.

FIG. 8 is a flowchart describing the operation of CPU 900 while FSK transceiver 224 is operating in transmit mode. First, CPU 900 scans power line cable 122 to determine a clear channel for transmission of serial data signal 152. For purposes of this specification the term "scan" means to examine successive portions of a frequency spectrum. The term "clear channel" means a frequency band comprising at least one frequency, the band having noise and signal levels associated therewith sufficiently low as to enable successful transmission of serial data signal 152 thereover. For FSK transmissions, a channel includes a frequency pair.

To perform the step of scanning, CPU 900 listens to, i.e., tunes in, the output of power line coupler 182 at a first selected frequency band as described in steps 700 and 705. To accomplish step 705, CPU 900 provides a frequency band select signal 156 to variable dividers 174 and 176 of transmitter 150. Frequency band select signal 156 sets the division factor for variable dividers 174 and 176. The division factor set by signal 156 causes dividers 174 and 176 to divide clock signal 158 by the appropriate factor to produce frequency pair fc and 0.75 fc at the first selected frequency band. Frequency pair fc and 0.75 fc are provided to band pass filters 184 and 186, thereby setting the receive frequency band of the filters to the first selected frequency band.

To accomplish step 710, CPU 900 initially sets gain select signal 160 to its highest gain setting according to step 710. In one embodiment of the invention, gain is represented on a scale of 1–10, one being the lowest gain setting and 10 being the highest. In one embodiment of the invention, gain settings are in increments of 3 decibels (dB). As those of ordinary skill in the art will recognize, other scales may be employed for representing gain and these alternatives remain within the scope of the invention.

Next, according to step 715, CPU 900 checks the state of gain adjust signal 162. If the state is true (logical one) the gain setting is reduced to its next lowest level, e.g., 9, according to step 720. In that case step 715 repeats as CPU 900 again checks the state of gain adjust signal 162. If the state remains true, the gain is again reduced by one. Steps 715 and 720 are repeated until the state of gain adjust signal 162 is zero (false).

When the state of gain adjust signal 162 is false (zero), CPU 900 stores the current gain setting for the current frequency band in memory, according to step 725.

Then, according to step 730, the next frequency band is selected via frequency band select signal 156. Steps 710 through 730 are repeated until gain values have been stored for all frequency bands. Next CPU 900 examines the stored gain values and their corresponding frequency bands and selects the frequency band corresponding to the highest stored gain value according to step 735. (The highest gain value corresponds to the frequency band having the lowest noise level.) CPU 900 configures FSK transmitter 224 to transmit using the frequency band selected in step 735. As previously explained, frequency bands are selected via frequency band select signal 156.

Next CPU 900 enables transmitter 224 via transmit enable signal 154, according to step 740. Next CPU 900 provides the preamble portion of the data packet to be transmitted via data signal 152 according to step 745. Next CPU 900 provides the data portion of the data packet to be transmitted via data signal 152 according to step 750. When the packet has been transmitted, CPU 900 turns off transmitter 224 via transmit enable signal 154 according to step 755.

CPU in Receive Mode

Figure 9:
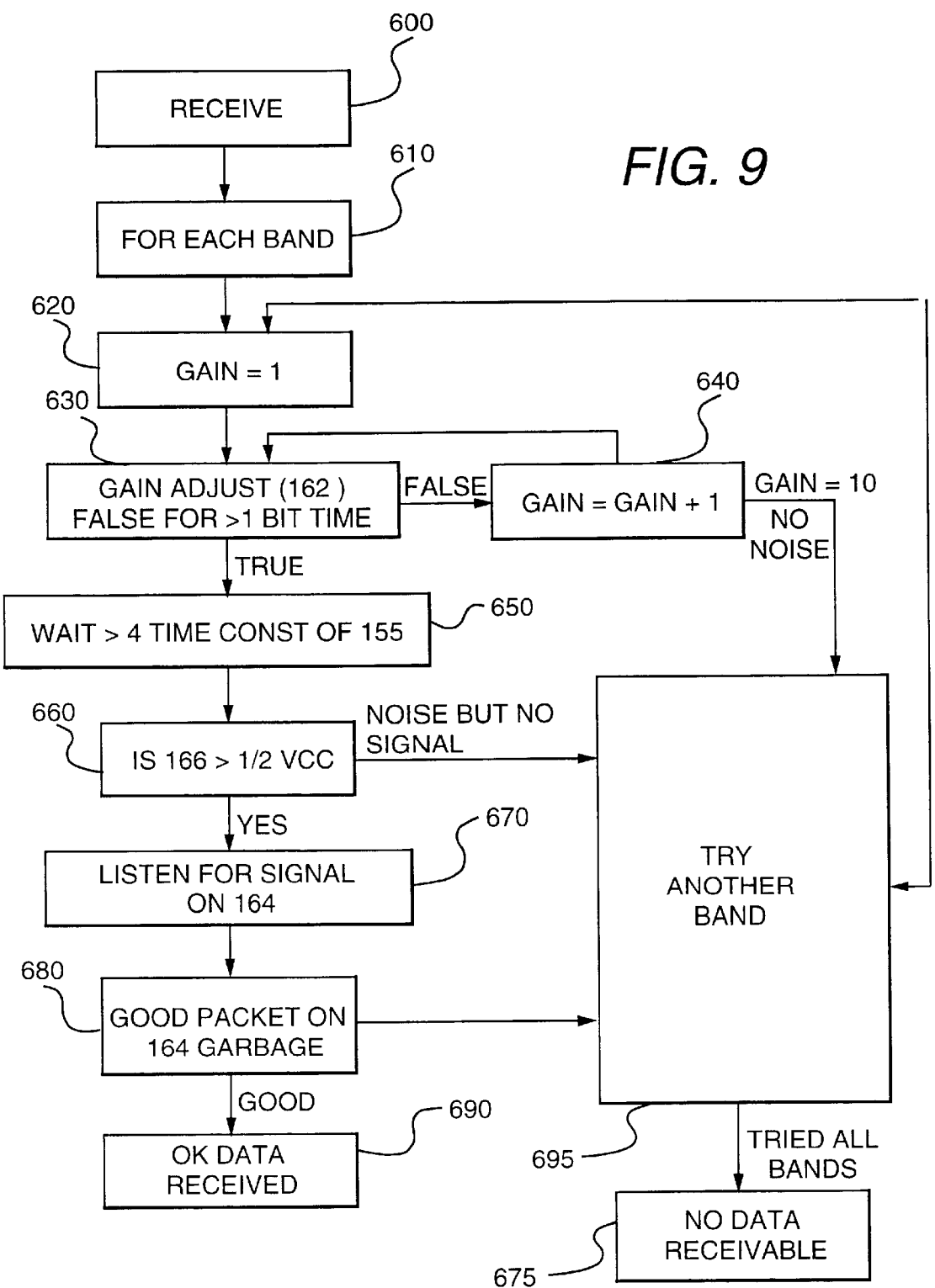
FIG. 9 is a flowchart depicting the operation a CPU in receive mode in accordance with an embodiment of the invention.

To operate in receive mode CPU 900 executes the steps described in FIG. 9. The first step, 600, is to listen to, i.e., tune in to, the power line at the output of coupler 182 at a first selected frequency band. To accomplish this CPU 900 provides frequency band select signal 156 to variable dividers 174 and 176 of transceiver 150 (shown in FIG. 4) To accomplish this step, CPU 900 provides a frequency band select signal 156 to variable dividers 174 and 176 of transmitter 150. Frequency band select signal 156 sets the division factor for variable dividers 174 and 176. The division factor set by signal 156 causes dividers 174 and 176 to divide clock signal 158 by the appropriate factor to produce frequency pair fc and 0.75 fc at the first selected frequency band. Frequency pair fc and 0.75 fc are provided to bandpass filters 184 and 186, thereby setting the receive frequency band of the filters to the first selected frequency band.

Next, CPU 900 sets the gain of variable gain amplifiers 188 and 190 to the lowest gain setting, e.g., 1, by means of gain select signal 160, according to step 620. Next, according to step 630, CPU 900 determines if the power line is quiet in the first selected frequency band. To do this CPU 900 checks gain adjust signal 162 to determine whether signal 162 remains false for greater than a single bit period. A single bit period is the time duration of a single data bit, regardless of its state. If this condition is not met, CPU 900 increases the gain setting of variable gain amplifiers 188 and 190 to the next gain value, e.g., 2, according to step 640. Step 630 is repeated until the condition is met, i.e., gain adjust signal 162 is false for greater than a single bit period. However, if the highest gain level, e.g., 10 is reached without meeting the condition in step 630, CPU 900 configures, by means of setting frequency band select signal 160, band pass filters 184 and 186 to pass the next frequency band according to step 695. In this case CPU 900 repeats steps 620 through 630 until the condition in step 630 is met.

When the condition in step 630 is met, indicating the power line is not quiet, CPU 900 determines whether noise only or, a potential signal in the presence of noise, is present on data output 164. In one embodiment of the invention, CPU 900 accomplishes this by waiting for a period of time equal to about 4 times the time constant of signal quality circuit 155, then CPU 900 checks to see if the voltage of signal quality signal 166 is greater than about one half of Vcc, according to steps 650 and 660. If the voltage of signal quality signal 166 is not greater than about one half of supply voltage Vcc (indicating the presence of noise without a signal) CPU 900 selects the next frequency band by setting frequency band select signal 156.

Then, CPU 900 steps 620 through 660 are repeated until the voltage detected on line 166 is greater than about one half of Vcc (indicating the presence of a signal in noise). When the voltage on line 166 is greater than about one half Vcc, CPU 900 checks serial data output signal 164 to verify that a data packet is present according to steps 670 and 680. Step 680 is performed using typical packet verification schemes known to those of ordinary skill in the art.

If the results of step 680 indicate the absence of a data packet, CPU 900 selects the next frequency band as per step 695, by setting frequency band select signal 156. CPU 900 then repeats steps 620 through 680 until a packet is present according to step 680. According to step 690, when a packet is present, CPU 900 indicates that the data being received is a valid packet and no further frequency band changes are made. If no frequency band results in the detection of a good packet, CPU 900 indicates that no data signals are present on the power line, according to step 675.

By employing several FSK power line transmitters 224 and only one FSK power line receiver 300, the cost of communicating voltage and current data to a central database is reduced. This cost reduction is realized because the cost of transmitting utility meter data is less expensive than the cost of receiving utility meter data, thus, enabling circuitry having low power consumption to be utilized in transmitter 224.

The number of FSK power line transmitters 224 on power lines 122, 124, and 126 is equivalent to the total number of houses minus the number of FSK power line receivers 300. This number of FSK power line transmitters is required because at least one FSK power line receiver 300 is necessary to collect the data transmitted from each utility meter. This "local area network" is thus capable of transmitting power conditions from each building to central database 140 wherein central database 140 is adapted to record power measurements over time and provide this data to the utility company.

To increase the reliability of the "local area network" more than one building may employ a respective FSK power line receiver 300 and thus transmit redundant data from a least two buildings to central database 140. With this level of redundancy, utility meter data from each building within the "local area network" is transmitted to central database 140 from least two sources providing redundancy and added reliability within the local area network.

Amplitude Modulation Communications Module

An amplitude modulation transceiver 250 is utilized to communicate meter information between buildings of the "local area network" to a remote interrogator 138, as is illustrated in FIG. 8. Amplitude modulation transceiver 250 comprises the following elements: an antenna 252; an antenna coupler 254; a radio frequency amplifier 260; a modulator 262; a low-pass filter 264; a low frequency amplifier 266; an inverter 268; a first divider 270; a second divider 272; a digital to analog converter 274; a voltage controlled oscillator 276; and a radio frequency power amplifier 278.

Amplitude modulation transceiver 250 is coupled to a digital voltage signal line 286, and generates three signals, including a detector signal at detector signal line 280, a band pass filter signal at band pass filter signal line 282, and a scaled frequency signal at scaled frequency signal line 284. Components of amplitude modulation transceiver 250 are interconnected as is illustrated in the schematic block diagram of FIG. 8.

The above-described amplitude modulation transceiver 250 receives a wake-up signal from remote interrogator 138. The signal is received by antenna 252 and is coupled to modulator 262 by antenna coupling 254. This coupled signal provides broad bandpass data which include both the frequency of the wake-up signal and the frequency of the responding transmission. The signal is amplified by radio frequency preamplifier 260 and is mixed with the local oscillator frequency generated by voltage controlled oscillator 276. The mixer signal generated by modulator 262 is then filtered by lowpass filter 264 and is utilized by the CPU to select only the signals at the wake-up frequency. Alternatively, lowpass filter 264 may be a band pass filter which enables a specified band of frequencies to pass and prevent other frequencies from passing through filter 264. The lowpass signal generated by lowpass filter 264 is coupled to low frequency amplifier 266 and amplified. The bandpass signal generated by low frequency amplifier 266 is coupled to the CPU by bandpass signal line 282. Note that band pass signal line 282 will only be utilized in the event that filter 264 is a bandpass filter. The low frequency signal generated by low frequency amplifier 266 is coupled to level detector 268. Detector 268 is a level sensor and is coupled to a detector signal line 280. A detector signal is generated on detector signal line 280 when the low frequency signal is above a predetermined detection level. For example, the signal detection level of detector 268 is 5 volts rms at less than 1000 Hertz. This signal detection level is chosen such that noise and unwanted low pass signals will not trigger level detector 268.

In order to transmit a reply signal the CPU determines what the desired transmitted frequency should be and sends the corresponding digital code via digital voltage signal line 286 to digital to analog converter 274. This digital code is used to determine the analog level at voltage controlled oscillator 276 so as to produce the frequency of oscillation corresponding with the respective digital code generated by the CPU. Voltage controlled oscillator 276 produces a voltage controlled oscillator frequency which is sensed by radio frequency power amplifier 278, multiplier 262, and divider 270, as described above. Once the voltage controlled oscillator frequency has been established, the CPU then electrically couples utility meter data over data line 288 to radio frequency power amplifier 278 to generate an amplitude modulated radio frequency signal. The amplitude modulated signal is then coupled through antenna coupler 254 to antenna 252 where it is transmitted to remote interrogator 138. Remote interrogator 138 may also be coupled to central database 140 (FIG. 1) for communicating utility meter data to central database 140.

The CPU may determine the temporal interval at which amplitude modulation transceiver 250 is not transmitting by monitoring the idle time interval after a wake-up signal is transmitted, hereinafter referred to as the "idle-time." The CPU then generates a code for each one of a range of possible frequencies. The codes are coupled to digital to analog converter 274—each code being coupled to digital to analog converter 274 via digital voltage signal line 286 where each respective code causes a respective voltage level to be coupled to voltage controlled oscillator 276, and a corresponding respective frequency to be generated by voltage controlled oscillator 276. The modal interval in which the CPU sends the above identified frequency codes to transceiver 250 is called the calibration mode. The respective voltage controlled oscillator frequency generated by voltage controlled oscillator 276 is then electrically coupled to divider 270, where the voltage controlled oscillator frequency is reduced by a predetermined factor, for example a factor of sixty-four, and is identified as the scaled frequency signal. An additional divider 272 may be utilized to further reduce the scaled frequency signal depending on the frequency measuring limitations of the CPU. While sixty-four was chosen as the divider factor any other factor could have been chosen that provided a result compatible with the CPU. The scaled frequency signal generated by divider 270 is then coupled to the CPU via scaled frequency signal line 284.

The CPU may determine the frequency of the scaled frequency signal by the utilization of a timer counter (not shown). The timer counter is typically located on the CPU. The CPU is adapted to count the number of zero crossings of scaled frequency signal that occur within a signal half cycle, and uses this number to determine the voltage controlled oscillator frequency generated by voltage controlled oscillator 276 based on the respective code from digital voltage signal line 286. The CPU then generates a table of the respective voltage controlled oscillator frequency for each respective computer code generated. This table is continuously updated so as to provide fresh utility meter data that reduces the error caused by temperature changes and component drift, thus enabling amplitude modulation transceiver 250 to provide accurate frequency measurement utilizing few electronic components. The frequency table may alternatively be an algorithm. Amplitude modulation transceiver 250 thus is adapted to transmit data to remote interrogator 138 when prompted. Remote interrogator 138 may then be coupled to central database 140 for communicating utility meter data to central database 140. Remote interrogator 138 may be coupled to central database 140 by either telephone link 139 or radio frequency link 141, as illustrated in FIG. 1.

The above amplitude modulation method may also generate a spread spectrum modulation scheme, where the digital data stream is multiplied by a set of frequencies in a pseudo random manner over a narrow frequency band. For example, random frequencies may be randomly generated over a frequency band from about 3000 to about 4000 hertz in divisions separated by about 16 hertz. In this case, the CPU generates a different set of amplitude frequencies, such as 63, repeating in a pseudo random manner as can be accomplished by a serial dual feedback shift register (not shown). Amplitude modulator 250 is used as a gating junction switching the radio frequency power "ON" and "OFF" via data line 288 after the frequency selected by the CPU has been stabilized. Thus, different sets of pseudo random frequency bursts are transmitted for the signals corresponding to logical "1" and "0." By way of example, when the data signaling rate is 100 baud the corresponding frequency shift rate is 6300 baud given 63 pseudo random steps. It is understood that different spread spectrum gains can be utilized.

While utility meter system 100 is an electric utility meter system which measures the electrical power used by a building, any other utility meter will alternatively function similarly. For example, a water meter is modified such that the water consumption within a building is measured electronically by usage measurement device 210. Alternatively, a natural gas utility meter is modified such that the natural gas consumed within a building is measured electronically by usage measurement device 210.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A system for transmitting and receiving utility meter data via a power line, said system comprising:
   a plurality of utility meters adapted to measure utility usage of respective customers and to provide utility meter data based on said usage;
   a power line extending between said customers so as to form a local area network;
   a plurality of transceivers, each of said transceivers coupled to a corresponding utility meter and to said power line, said transceivers adapted to receive utility meter data provided by said utility meters and to transmit said utility meter data over said power line;
   said transceiver including a receiver, said receiver adapted to receive said utility meter data from said power line and wherein said receiver is further adapted to monitor said power line for the presence of radio frequency transmissions, said receiver including at least one narrow band pass filter for filtering signals on said power line and wherein the center frequency of said band pass filter is selectable.

2. The system recited in claim 1 wherein said receiver is adapted to detect utility meter data being transmitted over said power line.

3. The system of claim 1 wherein said transceiver is a Frequency Shift Keyed (FSK) transceiver.

4. The system as recited in claim 1 wherein said utility meters are selected from the group including a electric utility meter, a gas utility meter, and a water utility meter.

5. A method of communicating data over a power line comprising the steps of:
   scanning said power line to identify clear frequency bands; and,
   transmitting said data utilizing said clear frequency bands
   wherein the step of scanning includes the step of selecting successive passbands of a selectable band pass filter such that said band pass filter passes selected frequency bands to a receiver;
   determining and storing noise levels corresponding to said passed selected frequency bands;
   selecting a clear frequency band based upon said stored noise levels.

6. The method of claim 5 wherein said data is utility meter data.

7. The method of claim 5 wherein said transmitting step is accomplished using a frequency shift keying (FSK) modulation technique.

8. A method of receiving data from a power line comprising the steps of:
   coupling said power line to a receiver by means of a selectable band pass filter;
   scanning said power line to identify at least one frequency band by which a signal including said data is being transmitted via said power line; and
   setting the passband of said selectable band pass filter to include the frequency band identified in the previous step.

9. The method of claim 8 wherein the step of scanning includes the steps of:
   selecting successive passbands of said selectable band pass filter such that said band pass filter passes selected frequency bands to said receiver;
   determining, for each successive passed frequency band, if a signal including said data is being transmitted via said passed frequency band.

10. The communications module as recited in claim 8, wherein said module further comprises a radio frequency antenna coupled to said power amplifier.

11. The communications module as recited in claim 10, wherein said module further comprises a level detector coupled to said low frequency amplifier and adapted to generate a detection signal when the signal generated by said low pass filter is above a predetermined voltage threshold.

12. The communications module as recited in claim 8, wherein said module further comprises a radio frequency amplifier coupled to said voltage controlled oscillator, wherein said radio frequency amplifier is adapted to generate a radio frequency signal for transmission over said antenna.

13. The communications module as recited in claim 12, wherein said predetermined voltage threshold is about five volts.

14. The communications module as recited in claim 8, wherein said module further comprises at least one divider coupled to said power amplifier and adapted to reduce the frequency of said voltage controlled oscillator frequency signal so as to enable the external computer to measure the frequency of said voltage controlled oscillator frequency signal.

15. The communications module as recited in claim 14, wherein said voltage controlled oscillator is controlled by a pseudo random signal so as to generate a spread spectrum voltage control oscillator frequency signal.

16. An amplitude modulated communications module coupled to a utility meter and coupled to an external computer, said communications module comprising:
  a power amplifier, said power amplifier adapted to generate a data signal;
  a voltage controlled oscillator coupled to the external computer, wherein said voltage controlled oscillator is adapted to generate a voltage controlled oscillator frequency signal in correspondence with a frequency code generated by the external computer;
  a modulator coupled to said power amplifier and coupled to said voltage controlled oscillator, wherein said modulator is adapted to generate a modulated signal corresponding to said data signal and having a modulation frequency equal to the frequency of said voltage controlled oscillator frequency signal;
  a low pass filter coupled to said modulator, wherein said low pass filter is adapted to generate a low pass signal in correspondence with the modulated signal.

17. A power line transceiver utilizing frequency shift keying for communicating utility meter data from a respective building to a remote database comprising:
  at least one pair of variable dividers for generating an adjustable center frequency signal and an adjustable non center frequency signal wherein said center frequency signal is greater than said non center frequency signal by a fixed ratio;
  a power amplifier coupled to said at least one pair of variable dividers for generating a power amplifier signal having a frequency in correspondence with said center frequency signal and in correspondence with said non center frequency signal; and
  at least one pair of adjustable narrow bandpass filters coupled to said power amplifier and adapted to detect said center frequency signal and said non center frequency signal.

18. The power line transceiver as recited in claim 17, wherein said transceiver further comprises a reference voltage source, wherein said reference voltage source is adapted to generate a reference signal.

19. The power line transceiver as recited in claim 17, wherein said transceiver further comprises at least one pair of variable gain amplifiers coupled to said pair of narrow bandpass filters for adjusting the gain of said pair of narrow band pass filters.

20. The power line transceiver as recited in claim 19, wherein said transceiver further comprises a first envelope detector, and a second envelope detector, wherein each envelope detector is coupled to one of said pair of variable gain amplifiers, and wherein said first envelope detector is adapted to generate a first band pass filter signal, and wherein said second envelope detector is adapted to generate a second band pass filter signal.

21. The power line transceiver as recited in claim 19, wherein said transceiver further comprises a gain adjust comparator coupled to each of said first envelope detector, said second envelope detector, and said reference voltage source, wherein said gain adjust comparator is adapted to generate a gain adjust signal when the first band pass signal is greater than the reference signal, and alternatively when said second band pass signal is greater than the reference signal.

22. The power line transceiver as recited in claim 21, wherein said transceiver further comprises a signal quality comparator coupled to each of said first envelope detector, said second envelope detector, and said reference voltage source, wherein said signal quality comparator is adapted to generate a signal quality signal when the first band pass signal and the second band pass signal is greater than the reference signal.

23. The power line transceiver as recited in claim 22, wherein said transceiver further comprises a serial data comparator coupled to each of said first envelope detector and said second envelope detector, wherein said serial data comparator is adapted to generate a serial data signal which comprises the first band pass signal and the second band pass signal.

\* \* \* \* \*